(12) United States Patent
Hwang et al.

(10) Patent No.: US 10,187,168 B2
(45) Date of Patent: Jan. 22, 2019

(54) METHOD FOR PERFORMING NETWORK ASSISTED INTERFERENCE CANCELLATION AND SUPPRESSION IN SITUATION IN WHICH CARRIER AGGREGATION IS SET, AND USER EQUIPMENT

(71) Applicant: LG ELECTRONICS INC., Seoul (KR)

(72) Inventors: Jinyup Hwang, Seoul (KR); Yoonoh Yang, Seoul (KR); Sangwook Lee, Seoul (KR); Suhwan Lim, Seoul (KR); Manyoung Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 91 days.

(21) Appl. No.: 15/520,402

(22) PCT Filed: Oct. 28, 2015

(86) PCT No.: PCT/KR2015/011421
§ 371 (c)(1),
(2) Date: Apr. 19, 2017

(87) PCT Pub. No.: WO2016/068595
PCT Pub. Date: May 6, 2016

(65) Prior Publication Data
US 2017/0317775 A1 Nov. 2, 2017

Related U.S. Application Data

(60) Provisional application No. 62/072,410, filed on Oct. 29, 2014.

(51) Int. Cl.
*H04J 11/00* (2006.01)
*H04W 74/00* (2009.01)
(Continued)

(52) U.S. Cl.
CPC ......... *H04J 11/005* (2013.01); *H04W 74/004* (2013.01); *H04J 11/00* (2013.01);
(Continued)

(58) Field of Classification Search
CPC .... H04J 11/005; H04J 11/00; H04J 2211/001; H04J 11/004; H04L 25/03006;
(Continued)

(56) References Cited

PUBLICATIONS

PCT International Application No. PCT/KR2015/011421, International Search Report dated Feb. 11, 2016, 2 pages.
(Continued)

*Primary Examiner* — Mewale A Ambaye
(74) *Attorney, Agent, or Firm* — Lee, Hong, Degerman, Kang & Waimey

(57) ABSTRACT

Provided is a method for performing network assisted interference cancellation and suppression (NAICS) in user equipment (UE) in which a carrier aggregation (CA) is set. The method can comprise the steps of: receiving a UE capability request message; and transmitting UE capability information by responding to the UE capability request message. The UE capability information can include information related to an NAICS operation in a situation in which a CA is set. The method can comprise a step of receiving interference cancellation support information from a base station. The interference cancellation support information can include information on neighboring cells identified by respectively operating in one or more carriers which are selected by the base station on the basis of the transmitted UE capability information. The method can comprise a step of cancelling the interference received from the neighboring cells, on the basis of the information on the neighboring cells within the interference cancellation support information.

6 Claims, 13 Drawing Sheets

(51) Int. Cl.
*H04W 84/04* (2009.01)
*H04W 52/24* (2009.01)
*H04W 88/02* (2009.01)

(52) U.S. Cl.
CPC ...... *H04J 2211/001* (2013.01); *H04W 52/243* (2013.01); *H04W 84/045* (2013.01); *H04W 88/02* (2013.01)

(58) Field of Classification Search
CPC ............ H04L 25/0224; H04W 74/004; H04W 52/243; H04W 84/045; H04W 88/02
See application file for complete search history.

(56) References Cited

PUBLICATIONS

Ericsson, "NAICS functionality, robustness, and configurability", R1-142322, 3GPP TSG-RAN WG1 #77, May 2014, 6 pages.
Huawei, et al., "Discussion on network assistance signalling for NAICS receivers", R1-140060, 3GPP TSG RAN WG1 Meeting #76, Feb. 2014, 7 pages.
CMCC, "TDD aspects for NAICS", R1-143240, 3GPP TSG RAN WG1 Meeting #78, Aug. 2014, 5 pages.
CMCC, "Remaining issues for NAICS higher-layer signaling", R1-142867, 3GPP TSG RAN WG1 Meeting #78, Aug. 2014, 7 pages.
Samsung, "Performance Impact of Network Assistance Signalling for NAICS", R1-140893, 3GPP TSG RAN1 #76, Feb. 2014, 9 pages.

METHOD FOR PERFORMING NETWORK ASSISTED INTERFERENCE CANCELLATION AND SUPPRESSION IN SITUATION IN WHICH CARRIER AGGREGATION IS SET, AND USER EQUIPMENT

CROSS-REFERENCE TO RELATED APPLICATIONS

This application is the National Stage filing under 35 U.S.C. 371 of International Application No. PCT/KR2015/011421, filed on Oct. 28, 2015, which claims the benefit of U.S. Provisional Application No. 62/072,410, filed on Oct. 29, 2014, the contents of which are all hereby incorporated by reference herein in their entirety.

BACKGROUND OF THE INVENTION

Field of the Invention

The present invention relates to mobile communication.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink.

Such LTE may be divided into a frequency division duplex (FDD) type and a time division duplex (TDD) type.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Meanwhile, it is expected that small cells with small cell coverage are added to the coverage of a macrocell in a next-generation mobile communication system.

The addition of small cells may further aggravate inter-cell interference.

SUMMARY OF THE INVENTION

Accordingly, a disclosure of the present specification has been made in an effort to solve the aforementioned problem.

In order to accomplish the above object, one disclosure of this specification provides a method of performing network assisted interference cancellation and suppression (NAICS) in user equipment (UE) in which a carrier aggregation (CA) has been configured. The method may include the steps of receiving a UE capability request message and transmitting UE capability information in response to the UE capability request message. The UE capability information may include information about an NAICS operation in a situation in which a CA has been configured. The method may include the step of receiving interference cancellation assistance information from an eNB. The interference cancellation assistance information may include information about a neighbor cell checked to operate in one or more carriers selected by the eNB based on the transmitted UE capability information. The method may include the step of cancelling interference received from the neighbor cell based on the information about the neighbor cell within the interference cancellation assistance information.

The information about the NAICS operation in the situation in which the CA has been configured may include one or more of information about whether the UE performs an NAICS operation in the situation in which the CA has been configured and information about a maximum number of carriers supportable for NAICS.

The information about the NAICS operation in the situation in which the CA has been configured may include information about a carrier or frequency band on which the UE is capable of driving NAICS.

The method may further include the step of including the information about the NAICS operation in the situation in which the CA has been configured in a physical uplink control channel (PUCCH) along with channel state information (CSI) and transmitting the PUCCH.

The method may further include the step of transmitting indication, indicating that the UE is incapable of driving NAICS on one or more carriers selected by the eNB based on the transmitted UE capability information, to the eNB.

In order to accomplish the above object, one disclosure of this specification provides user equipment (UE) performing network assisted interference cancellation and suppression (NAICS) in a situation in which a carrier aggregation (CA) has been configured. The UE may include an RF unit and a processor controlling the RF unit. The processor may perform the processes of receiving a UE capability request message; transmitting UE capability information in response to the UE capability request message; receiving interference cancellation assistance information from an eNB; and cancelling interference received from a neighbor cell based on the interference cancellation assistance information. In this case, the UE capability information may include information about an NAICS operation in a situation in which a CA has been configured. The interference cancellation assistance information may include information about a neighbor cell checked to operate in one or more carriers selected by the eNB based on the transmitted UE capability information.

According to disclosures of the present specification, even though inter-cell interference increases, signal reception performance may be improved by interference cancellation.

DESCRIPTION OF EXEMPLARY EMBODIMENTS

Figure 1:
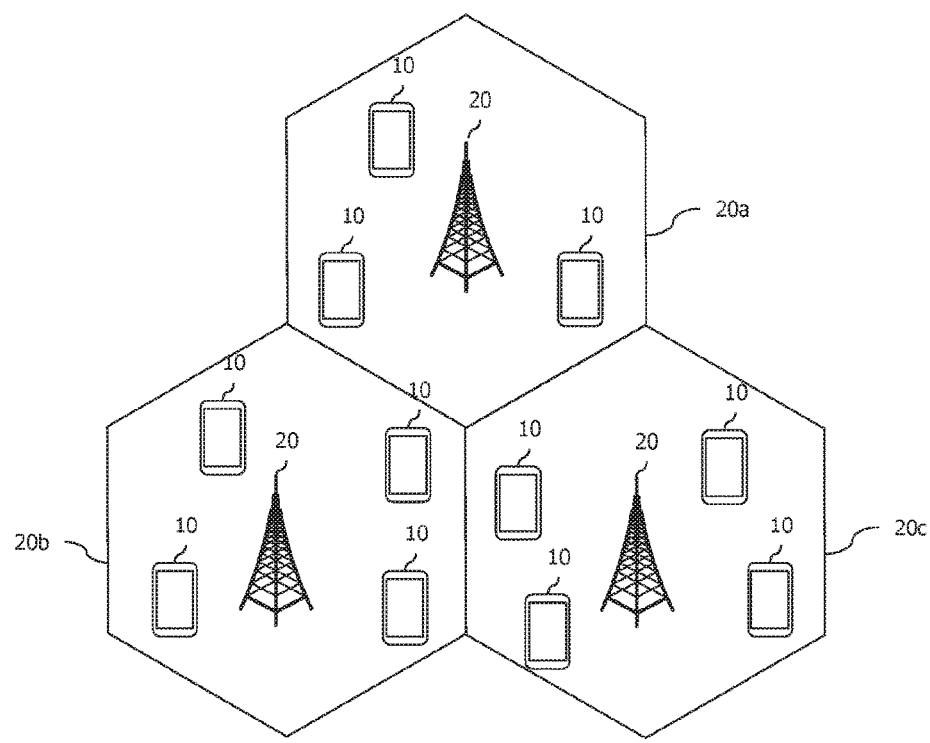
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, user equipment (UE) may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

Referring to FIG. 1, the wireless communication system includes at least one base station (BS) 20. Respective BSs 20 provide a communication service to particular geographical areas 20a, 20b, and 20c (which are generally called cells).

The UE generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Hereinafter, the LTE system will be described in detail.

Figure 2:
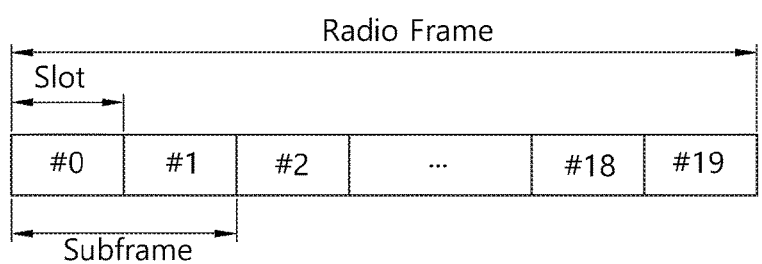
FIG. 2 illustrates the architecture of a radio frame according to frequency division duplex (FDD) of 3rd generation partnership project (3GPP) long term evolution (LTE).

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
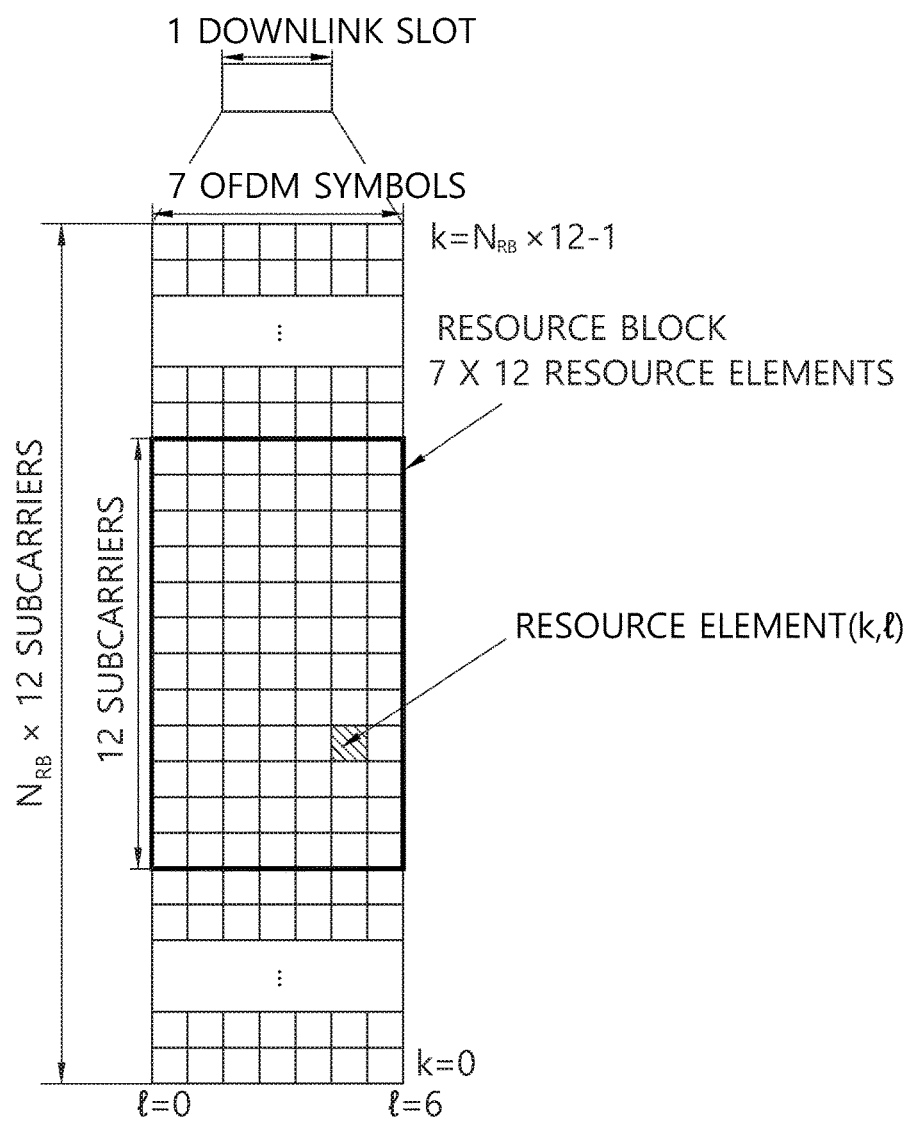
FIG. 3 illustrates an example resource grid for one uplink or downlink slot in 3GPP LTE.

FIG. 3 illustrates an example resource grid for one uplink or downlink slot in 3GPP LTE.

Referring to FIG. 3, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

Figure 4:
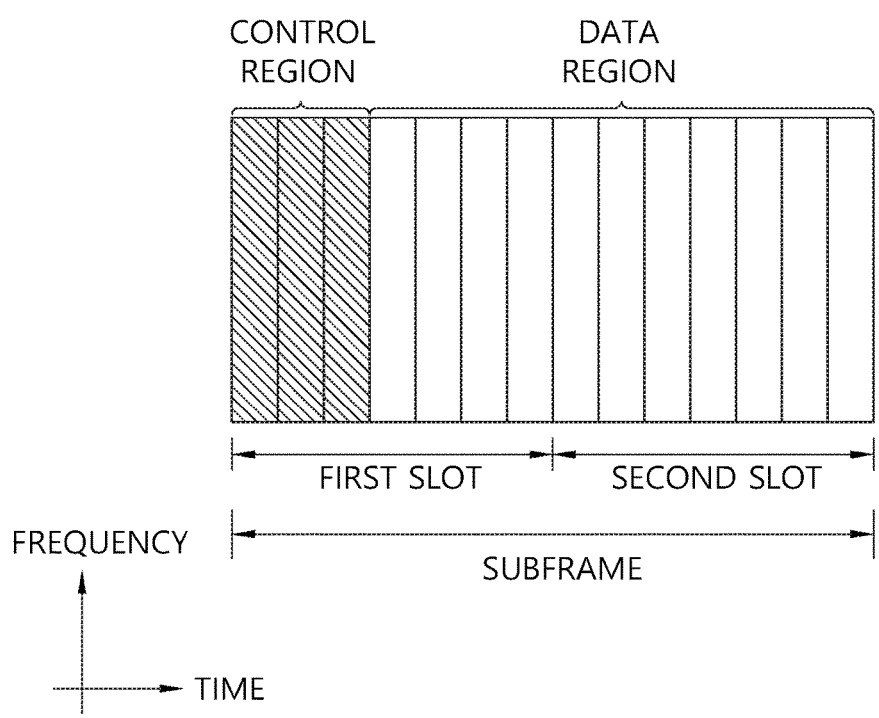
FIG. 4 illustrates the architecture of a downlink subframe.

In 3GPP LTE, the resource grid for one uplink slot shown in FIG. 4 may also apply to the resource grid for the downlink slot.

FIG. 4 illustrates the architecture of a downlink sub-frame.

In FIG. 4, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are allocated to the control region, and a PDSCH is allocated to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding. The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

The uplink channels include a PUSCH, a PUCCH, an SRS (Sounding Reference Signal), and a PRACH (physical random access channel).

Figure 5:
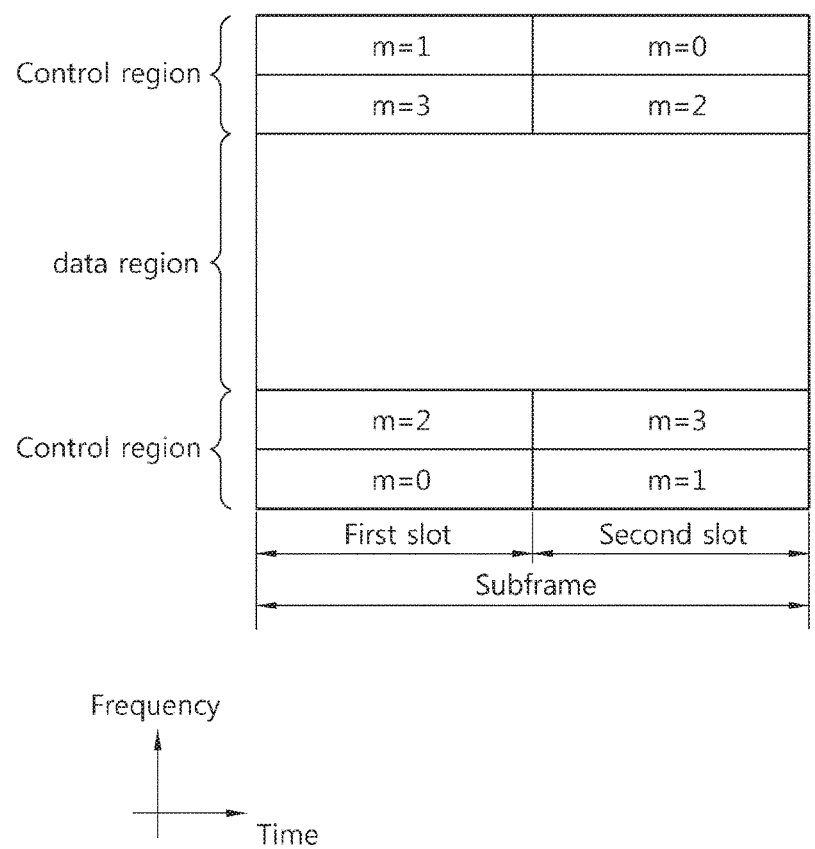
FIG. 5 illustrates the architecture of an uplink subframe in 3GPP LTE.

FIG. 5 illustrates the architecture of an uplink sub-frame in 3GPP LTE.

Referring to FIG. 5, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

<Carrier Aggregation: CA>

Hereinafter, a carrier aggregation system will be described.

The carrier aggregation (CA) system means aggregating multiple component carriers (CCs). By the carrier aggregation, the existing meaning of the cell is changed. According to the carrier aggregation, the cell may mean a combination of a downlink component carrier and an uplink component carrier or a single downlink component carrier.

Further, in the carrier aggregation, the cell may be divided into a primary cell, secondary cell, and a serving cell. The primary cell means a cell that operates at a primary frequency and means a cell in which the UE performs an initial connection establishment procedure or a connection reestablishment procedure with the base station or a cell indicated by the primary cell during a handover procedure. The secondary cell means a cell that operates at a secondary frequency and once an RRC connection is established, the secondary cell is configured and is used to provide an additional radio resource.

The carrier aggregation system may be divided into a continuous carrier aggregation system in which aggregated carriers are contiguous and a non-contiguous carrier aggregation system in which the aggregated carriers are separated from each other. Hereinafter, when the contiguous and non-contiguous carrier systems are just called the carrier aggregation system, it should be construed that the carrier aggregation system includes both a case in which the component carriers are contiguous and a case in which the component carriers are non-contiguous. The number of component carriers aggregated between the downlink and the uplink may be differently set. A case in which the number of downlink CCs and the number of uplink CCs are the same as each other is referred to as symmetric aggregation and a case in which the number of downlink CCs and the number of uplink CCs are different from each other is referred to as asymmetric aggregation.

When one or more component carriers are aggregated, the component carriers to be aggregated may just use a bandwidth in the existing system for backward compatibility with the existing system. For example, in a 3GPP LTE system, bandwidths of 1.4 MHz, 3 MHz, 5 MHz, 10 MHz, 15 MHz, and 20 MHz are supported and in a 3GPP LTE-A system, a wideband of 20 MHz or more may be configured by using only the bandwidths of the 3GPP LTE system. Alternatively, the wideband may be configured by not using the bandwidth of the existing system but defining a new bandwidth.

Meanwhile, in order to transmit/receive packet data through a specific secondary cell in the carrier aggregation, the UE first needs to complete configuration for the specific secondary cell. Herein, the configuration means a state in which receiving system information required for data transmission/reception for the corresponding cell is completed. For example, the configuration may include all processes that receive common physical layer parameters required for the data transmission/reception, media access control (MAC) layer parameters, or parameters required for a specific operation in an RRC layer. When the configuration-completed cell receives only information indicating that the packet data may be transmitted, the configuration-completed cell may immediately transmit/receive the packet.

The configuration-completed cell may be present in an activation or deactivation state. Herein, the activation transmitting or receiving the data or a ready state for transmitting or receiving the data. The UE may monitor or receive the control channel (PDCCH) and the data channel (PDSCH) of the activated cell in order to verify resources (a frequency, a time, and the like) assigned thereto.

The deactivation represents that transmitting or receiving traffic data is impossible or measurement or transmitting/receiving minimum information is possible. The UE may receive system information SI required for receiving the packet from the deactivated cell. On the contrary, the UE does not monitor or receive the control channel (PDCCH) and the data channel (PDSCH) of the deactivated cell in order to verify the resources (the frequency, the time, and the like) assigned thereto.

Figure 6:
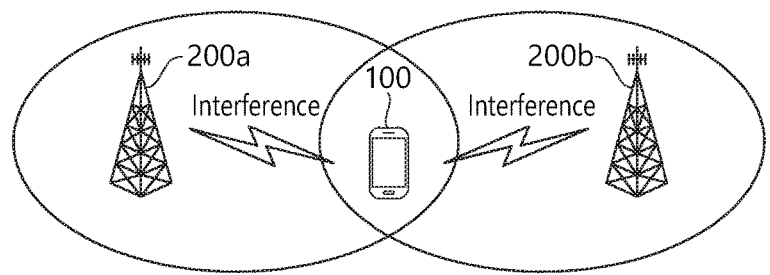
FIG. 6 illustrates inter-cell interference.

FIG. 6 illustrates inter-cell interference.

As illustrated in FIG. 6, when a UE 100 is located in an overlapping area of the coverage of a first cell 200a and the coverage of a second cell 200b, a signal of the first cell 200a acts as an interference with a second signal of the second cell 200b, while a signal of the second cell 200b acts as interference with a signal of the first cell 200a.

A basic method for addressing such an interference problem is using different frequencies for cells. However, since a frequency is a scarce and expensive resource, wireless service providers do not prefer a frequency division method.

Thus, the 3GPP employs a time division method to resolve the inter-cell interference problem.

Accordingly, the 3GPP has actively conducted studies on enhanced inter-cell interference coordination (eICIC) as an interference coordination method in recent years.

A time division method introduced in LTE-Release 10 has evolved as compared with a conventional frequency division method and thus is referred to as an enhanced ICIC. According to the time division method, an aggressor cell, which is a cell causing interference, suspends data transmission in a particular subframe so that a UE maintains connection to a victim cell, which is a cell undergoing the interference, in the subframe. That is, in the time division method, when different types of cells coexist, one cell temporarily suspends transmitting a signal to a UE having considerably high interference, thereby hardly sending an interference signal.

Meanwhile, the particular subframe in which data transmission is suspended is referred to as an almost blank subframe (ABS), in which no data is transmitted except for essential control data. The essential control data is, for example, a cell-specific reference signal (CRS). Therefore, not data but only CRSs are transmitted on OFDM symbols 0, 4, 7, and 11 in an ABS.

Figure 7:
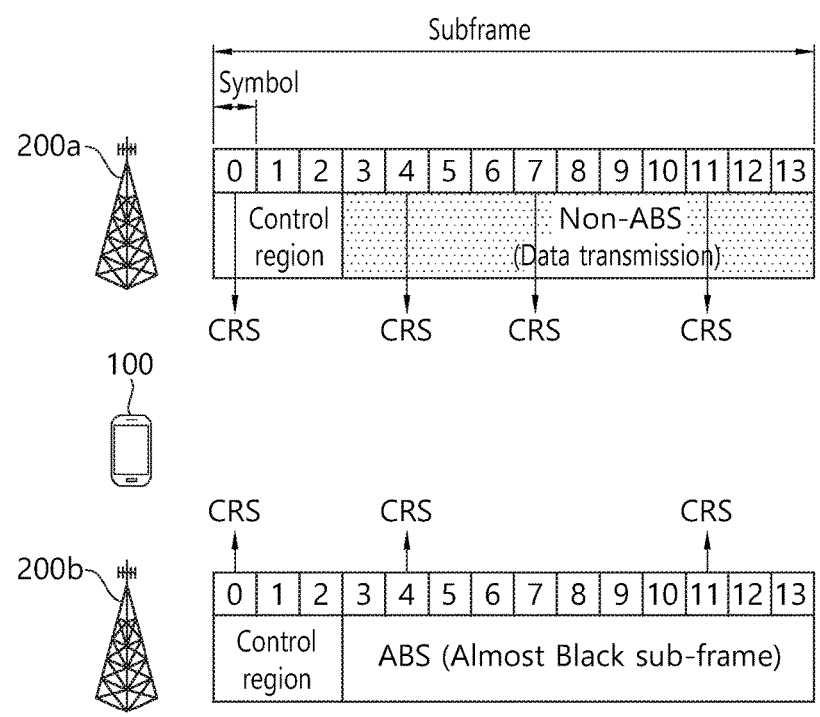
FIG. 7 illustrates enhanced inter-cell interference coordination (eICIC) to address interference between base stations.

FIG. 7 illustrates eICIC to address interference between BSs.

Referring to FIG. 7, data transmission is performed via a data region of a subframe for a first cell 200a.

Here, a second cell 200b applies eICIC to address interference. That is, when the eICIC is applied, a corresponding subframe is managed as an ABS, so that no data may be transmitted via the data region.

In the subframe managed as the ABS, only CRSs may be transmitted on symbols 0, 4, 7, and 11.

<Introduction of Small Cell>

It is expected that small cells with small cell coverage are added to the coverage of an existing cell in a next-generation mobile communication system and deal with greater traffic. The existing cell has relatively larger coverage than the small cells and thus is referred to as a macrocell, which is described with reference to FIG. 8.

Figure 8:
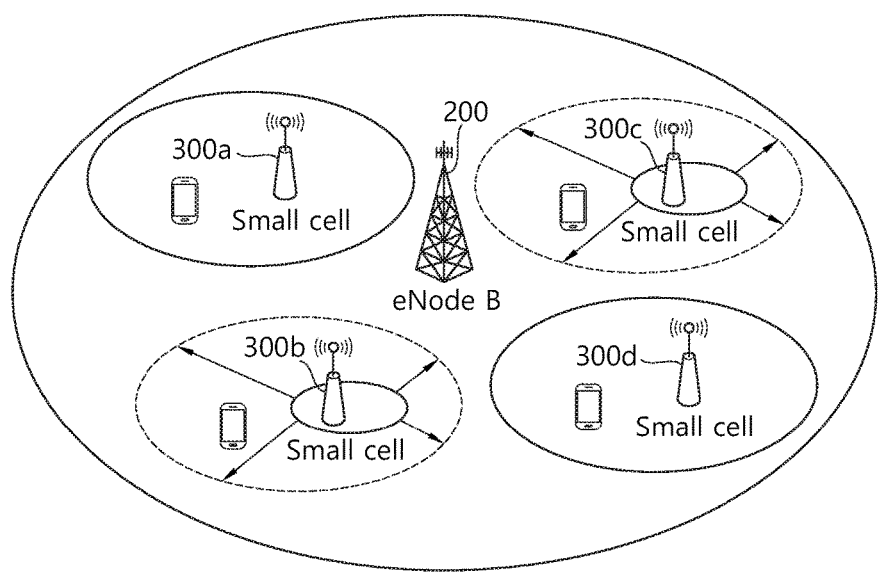
FIG. 8 illustrates an environment of a heterogeneous network including a macrocell and small cells as a potential next-generation wireless communication system.

FIG. 8 illustrates an environment of a heterogeneous network including a macrocell and small cells as a potential next-generation wireless communication system.

FIG. 8 shows a heterogeneous network environment in which a macrocell based on an existing BS 200 overlaps with small cells based on one or more small BSs 300*a*, 300*b*, 300*c*, and 300*d*. The existing BS provides relatively larger coverage than the small BSs and thus is also referred to as a macro BS (macro eNodeB: MeNB). In the present specification, a macrocell may be replaceable with a macro BS. A UE connected to the macrocell 200 may be referred to as a macro UE. The macro UE receives a downlink signal from the macro BS and transmits an uplink signal to the macro BS.

In this heterogeneous network, the macrocell is set as a primary cell (Pcell) and the small cells are set as secondary cells (Scell), thereby filling a gap in the macrocell coverage. Further, the small cells are set as primary cells (Pcell) and the macrocell is set as a secondary cell (Scell), thereby boosting overall performance.

The introduction of small cells, however, may aggravate inter-cell interference.

<Interference Cancellation>

As described above, in addition to solving the inter-cell interference problem through the eICIC method, there may be a method for performing, by UE 100, reception through interference cancellation (hereinafter referred to as "IC").

A serving cell may transfer IC support information to the UE so that the UE can efficiently cancel an interference signal from a neighbor cell.

As described above, the execution of reception through network assisted interference cancellation and suppression (NAICS) is referred to as "further enhanced inter-cell interference coordination (FeICIC)."

As described above, the SINR of a signal from a serving cell can be further improved and thus a performance gain can be obtained because an interference signal from a neighbor cell is cancelled.

A signal or channel, that is, the subject of interference cancellation, may be a cell-specific reference signal (CRS), a physical broadcasting channel (PBCH), a sync channel (SCH), or a physical downlink shared channel (PDSCH).

Figure 9A:
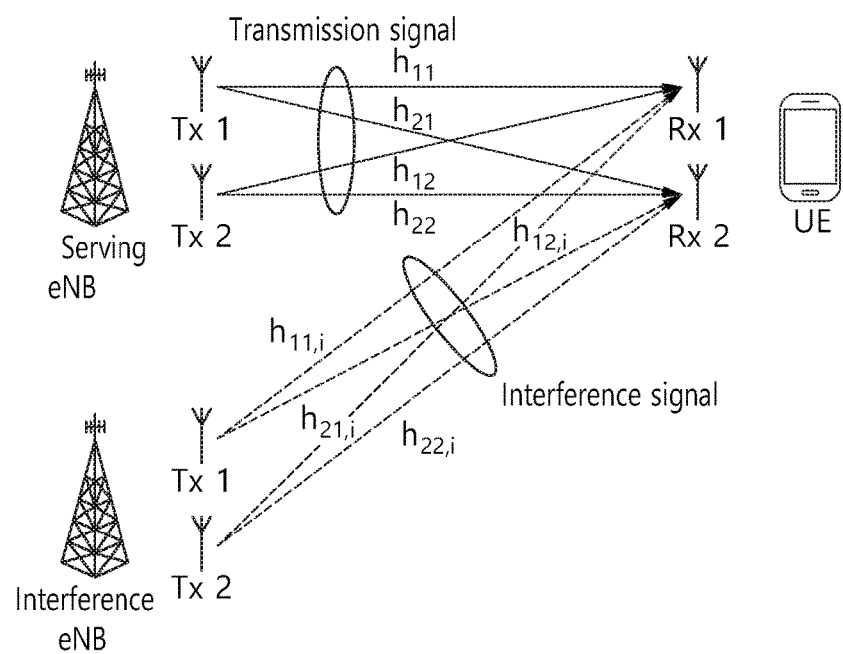
FIG. 9*a* is an exemplary diagram showing a situation in which a signal from a serving eNB interferes with an interference signal from an interference eNB.
Figure 9B:
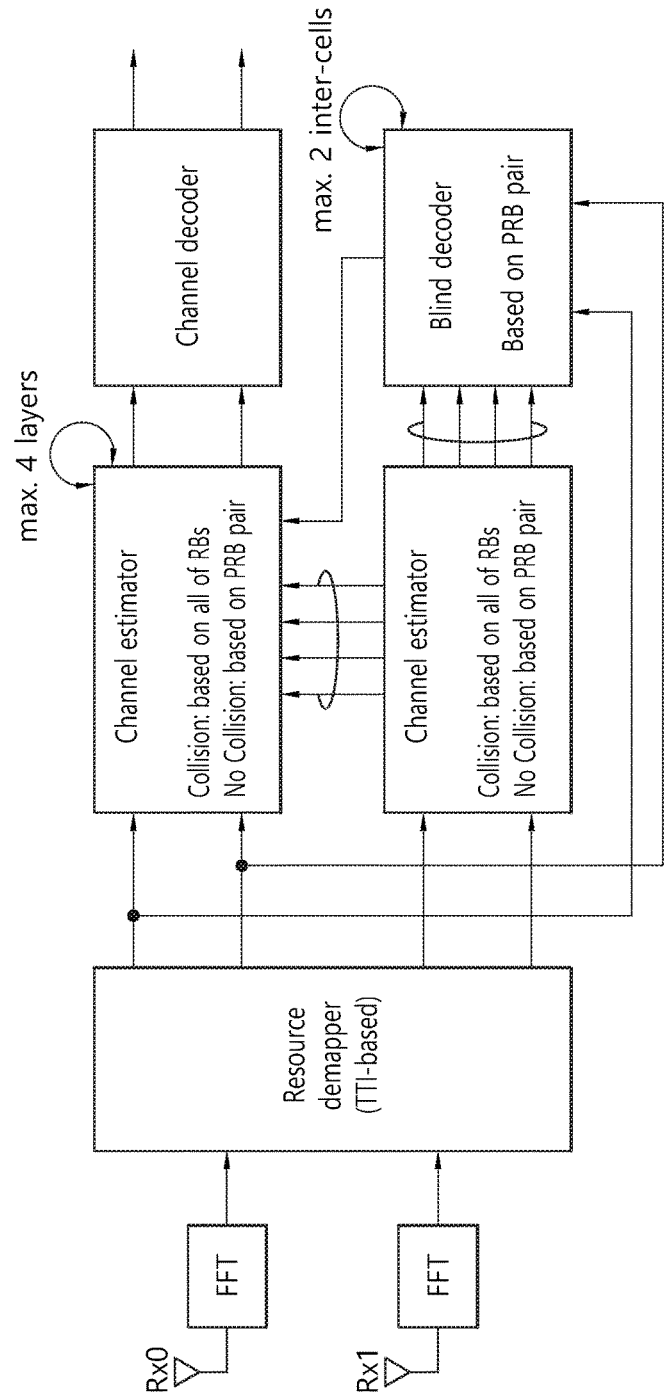
FIG. 9*b* shows the structure of UE for interference cancellation and suppression reception.

FIG. 9*a* is an exemplary diagram showing a situation in which a signal from a serving eNB interferes with an interference signal from an interference eNB, and FIG. 9*b* shows the structure of UE for interference cancellation and suppression reception.

As may be seen with reference to FIG. 9*a*, there is shown an example in which signals transmitted by a serving eNB through two transmission antennas Tx1 and Tx2 interfere with interference signals from an adjacent interference eNB. It is assumed that the number of illustrated reception antennas of UE is 2 or 4.

In such an environment, a channel response attributable to the interference may be mathematically modeled as follows.

$$y_{n,k} = \sum_{i=0}^{N_{cell}} H_{n,k}^i P_i x_{n,k}^i + z_{n,k} \quad \text{[Equation 1]}$$

$$\begin{bmatrix} y_{n,k,1} \\ \vdots \\ y_{n,k,b} \\ \vdots \\ y_{n,k,N_{rx}} \end{bmatrix} = \sum_{i=0}^{N_{cell}} \begin{bmatrix} h_{n,k,1}^{i,1} & \cdots & h_{n,k,1}^{i,N_{tx}^i} \\ \vdots & \ddots & \vdots \\ h_{n,k,N_{rx}}^{i,1} & \cdots & h_{n,k,N_{rx}}^{i,N_{tx}^i} \end{bmatrix}$$

$$\begin{bmatrix} p_{i,1} & \cdots & p_{i,N_{layer}^i} \end{bmatrix} \begin{bmatrix} x_{n,k}^{i,1} \\ \vdots \\ x_{n,k}^{i,N_{layer}^i} \end{bmatrix} + \begin{bmatrix} z_{n,k,1} \\ \vdots \\ z_{n,k,b} \\ \vdots \\ z_{n,k,N_{rx}} \end{bmatrix} \in \mathbb{C}^{N_{rx}}$$

In Equation 1, $y_{n,k,b}$ indicates a signal received on an n-th OFDM symbol, and $k_{th}$ indicates a k-th RE in the b-th antenna of UE from an i-th eNB.

Furthermore, $x^{i,1}_{n,k}$ means a signal transmitted on the k-th RE of the i-th eNB through an l-th layer on the n-th OFDM symbol.

$z_{n,k,b}$ means adaptive white Gaussian noise on the n-th OFDM symbol and the k-th RE of the b-th antenna of the UE.

$h^{i,a}_{n,k,b}$ indicates an impulse channel response from the a-th antenna of the i-th eNB to n-th OFDM symbol and k-th RE of the b-th antenna of the UE.

$P_i$ indicates a precoding matrix of the i-th eNB. If $N^i_{layer}=1$, the precoding matrix is expressed by Pi.

$N_{rx}$ is the number of reception antennas.

$N^i_{tx}$ is the number of transmission antennas of the i-th eNB $N^i_{layer}$ is the number of transmission layers from the i-th eNB.

An example in which NAICS has been used in only a single carrier environment has been described so far. As described above, in the single carrier environment, UE makes a report to a serving eNB through RSRP/RSRQ measurement for neighbor cells. The serving eNB notifies the UE of information about N interference cells for the NAICS of the UE.

However, in a carrier aggregation environment, information about an interference cell of which the UE needs to be notified by the serving eNB may be significantly increased. This is described with reference to FIG. 10.

Figure 10:
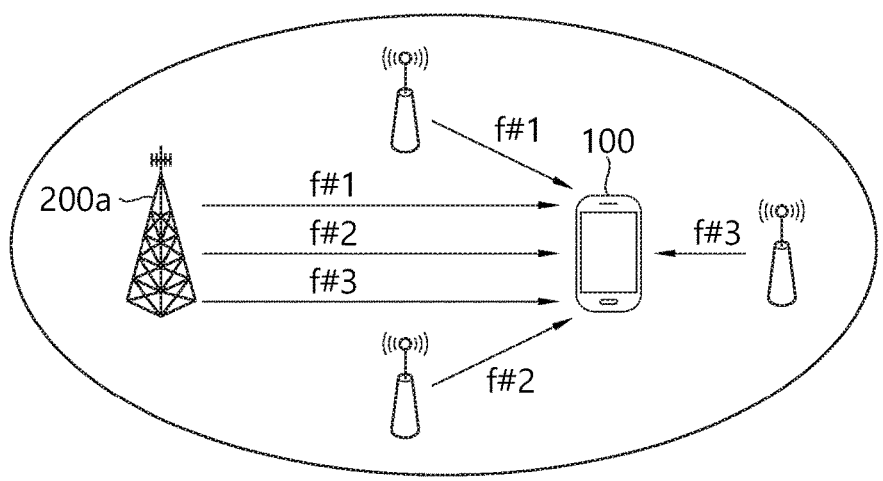
FIG. 10 shows an example in which UE interferes with neighbor cells in an environment in which the UE uses a plurality of carriers according to a carrier aggregation (CA).

FIG. 10 shows an example in which UE interferes with neighbor cells in an environment in which the UE uses a plurality of carriers according to a carrier aggregation (CA).

As may be seen with reference to FIG. 10, in accordance with the carrier aggregation (CA), a maximum of five carriers (three carriers f#1, f#2, and f#3 have been illustrated in FIG. 10) may be used between a serving eNB and UE.

From a viewpoint of the complexity of an implementation, however, it is difficult for UE to practically perform an NAICS operation on all of carriers. Even though, an eNB has to basically signal information about all of neighbor cells to UE that performs NAICS based on each of all of the carriers. Accordingly, if five carriers are aggregated, the eNB has to transfer information about 5×N neighbor cells. Accordingly, there is a problem in that network signaling overhead is increased.

In order to reduce such overhead, a method for randomly selecting, by the eNB, a specific carrier and transferring information about only a neighbor cell on the selected specific carrier to the UE. However, if the specific carrier randomly selected by the eNB is mismatched with a carrier on which the UE can drive NAICS, there is a problem in that the UE cannot have a gain of driving the NAICS.

<Disclosure of this Specification>

Accordingly, in order to solve the aforementioned problem, disclosures of this specification propose methods in which if UE performs NAICS in a carrier aggregation environment, the UE notifies an eNB of information about a carrier on which the UE can perform the NAICS and the eNB transfers only information about a neighbor cell capable of operating on a carrier on which the UE can actually perform the NAICS to the UE based on the information. The methods are sequentially described below.

I. UE-Triggering Method

I-1. Method Using UE Capability Information Query Procedure

UE capable of NAICS may transfer information about whether it can perform an NAICS operation in a maximum number of carriers or a carrier aggregation (CA) supportable for the NAICS (i.e., on or off) to an eNB using a UE capability signal. A detailed procedure of the method is described below.

When UE receives a UE capability message from a serving eNB, it transmits the UE capability information to the serving eNB. In this case, in order to obtain information about a neighbor cell on a carrier or band on which NAICS can be driven from the serving eNB, the UE includes information about the carrier or band on which the NAICS can be driven in the UE capability information and transmits the information. For example, if the UE can drive NAICS on the band 4 defined in 3GPP, it may include 'bandsupportedNAICS' in the UE capability information as in the following table and transmit the UE capability information to the serving eNB.

TABLE 1

| supportedBandCombination-r1x | BandCombinationParameters-r1x |
| BandParameters-r1x | bandEUTRA-r1x: 4 |
| bandsupportedNAICS | |

Meanwhile, the aforementioned method is described in more detail below with reference to FIG. 11.

Figure 11:
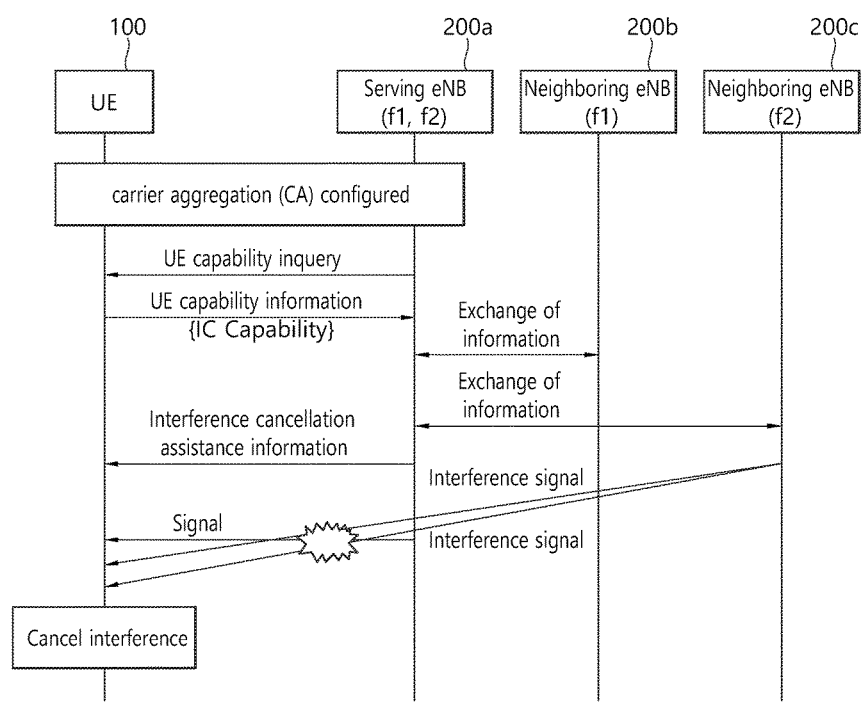
FIG. 11 is an exemplary signal flowchart illustrating an interference cancellation and suppression method in a carrier aggregation (CA) situation in accordance with one disclosure of this specification.

FIG. 11 is an exemplary signal flowchart illustrating an interference cancellation and suppression method in a carrier aggregation (CA) situation in accordance with one disclosure of this specification.

As may be seen with reference to FIG. 11, UE uses a carrier f1 and a carrier f2 along with a serving eNB 200a according to a carrier aggregation. The carrier f1 is further used by an adjacent eNB 200b, and the carrier f2 is further used by an adjacent eNB 200c.

The serving eNB 200a requests UE capability query from the UE 100 if necessary or in response to an instruction from a higher layer.

Accordingly, the UE 100 provides UE performance information in response to the request. That is, the UE 100a notifies a serving cell that it has an eICIC capability and interference cancellation (IC) capability through the UE capability information in response to the UE capability query.

Furthermore, the UE 100 in accordance with one disclosure of this specification includes information about a carrier or band on which NAICS may be driven in the UE capability query information and sends the information.

If the radio access performance of the UE 100 is changed, the higher layer of the UE 100 may instruct the higher layer of the serving cell to make a UE capability information request.

The serving eNB 200a may check whether the adjacent eNBs 200b and 200c are aggressors that cause interference by exchanging information with the adjacent eNBs 200b and 200c. If the adjacent eNB 200b and 200c are aggressors that cause interference, the serving eNB 200a obtains information about the adjacent eNBs 200b and 200c.

Next, if the serving eNB 200a has a signal to be transmitted to the UE 100, it transmits interference cancellation assistance information, including the obtained information, to the UE 100.

Next, the serving eNB 200a transmits a signal to the UE 100.

In this case, if the signal transmitted by the serving eNB 200a interferes with signals transmitted by the adjacent eNBs 200a and 200b, the UE 100 performs interference cancellation.

Other disclosures of this specification are described below.

I-2. Method Using PUCCH

In accordance with an existing technology, UE supporting a carrier aggregation (CA) needs to transmit a PUCCH, including CSI feedback, to a serving eNB for each carrier. Accordingly, if the UE supports NAICS, the UE may include and transmit information about whether the NAICS can be driven on a carrier corresponding to the PUCCH including the CSI feedback for each carrier. In this case, the information about whether the NAICS can be driven on the corresponding carrier may be expressed in a bit value form. For example, if a value of the bit is 0, it may mean that the NAICS cannot be driven on the corresponding carrier. If a value of the bit is 1, however, it may mean that the NAICS can be driven on the corresponding carrier.

II. eNB-Triggering Method

As described above, if an eNB randomly selects a specific carrier and transfers only information about a neighbor cell on the selected specific carrier to UE, the specific carrier randomly selected by the eNB may be matched with a carrier on which the UE may actually drive NAICS, but may be mismatched with the carrier.

First, if the specific carrier is matched with the carrier on which the UE may actually drive the NAICS, the UE may include indication indicating that the carrier randomly selected by the serving eNB must be maintained, for example, a bit in a PUSCH/PUCCH, and may transmit the PUSCH/PUCCH to the serving eNB.

In contrast, if the specific carrier is mismatched with the carrier on which the UE may actually drive the NAICS, the UE may transmit indication indicating that the carrier randomly selected by the serving eNB has been wrong, for example, a bit in a PUSCH/PUCCH, and may transmit the PUSCH/PUCCH to the serving eNB. Accordingly, the serving eNB may select another carrier based on the indication and may notify the UE of information about an adjacent eNB that operates on the selected another carrier.

The embodiments of the present invention described so far may be implemented through various means. For example, the embodiments of the present invention may be implemented by hardware, firmware, software or a combination of them. This is described in detail with reference to FIG. 12.

Figure 12:
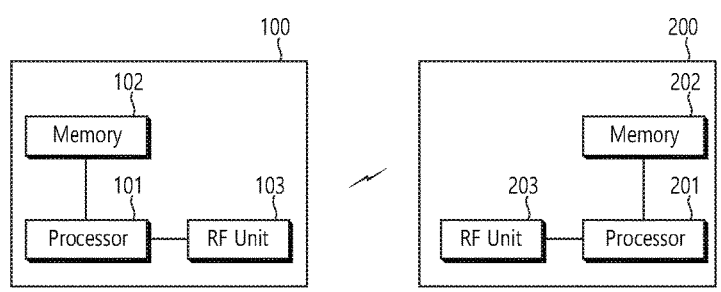
FIG. 12 is a block diagram showing a wireless communication system in which a disclosure of this specification is implemented.

FIG. 12 is a block diagram showing a wireless communication system in which a disclosure of this specification is implemented.

An eNB 200 includes a processor 201, memory 202, and a radio frequency (RF) unit 203. The memory 202 is connected to the processor 201 and stores a variety of pieces of information for driving the processor 201. The RF unit 203 is connected to the processor 201 and sends and/or receives a radio signal. The processor 201 implements the proposed functions, processes and/or methods. In the aforementioned embodiments, the operation of the eNB may be implemented by the processor 201.

The UE 100 includes a processor 101, memory 102, and an RF unit 103. The memory 102 is connected to the processor 101 and stores a variety of pieces of information for driving the processor 101. The RF unit 103 is connected to the processor 101 and sends and/or receives a radio signal. The processor 101 implements the proposed functions, processes and/or methods.

The processor may include application-specific integrated circuits (ASICs), other chipsets, logic circuits and/or data processors. The memory may include read-only memory (ROM), random access memory (RAM), flash memory, memory cards, storage media and/or other storage devices. The RF unit may include a baseband circuit for processing a radio signal. When the aforementioned embodiment is implemented in software, the aforementioned scheme may be implemented into a module (process or function) that performs the above function. The module may be stored in the memory and executed by the processor. The memory may be placed inside or outside the processor and may be connected to the processor using a variety of well-known means.

In the above exemplary system, although the methods have been described based on the flowcharts in the form of a series of steps or blocks, the present invention is not limited to the sequence of the steps, and some of the steps may be performed in a different order from that of other steps or may be performed simultaneous to other steps. Furthermore, those skilled in the art will understand that the steps shown in the flowchart are not exclusive and the steps may include additional steps or that one or more steps in the flowchart may be deleted without affecting the range of right of the present invention.

What is claimed is:

1. A method of performing network assisted interference cancellation and suppression (NAICS) in a user equipment (UE) in which a carrier aggregation (CA) has been configured, the method comprising:
    receiving a UE capability request message;
    transmitting UE capability information in response to the UE capability request message, wherein the UE capability information comprises information about an NAICS operation in a situation in which the CA has been configured;
    receiving interference cancellation assistance information from an eNB, wherein the interference cancellation assistance information comprises information about a neighbor cell checked to operate in one or more carriers selected by the eNB based on the transmitted UE capability information; and
    cancelling interference received from the neighbor cell based on the information about the neighbor cell within the interference cancellation assistance information,
    wherein the information about the NAICS operation in the situation in which the CA has been configured comprises one or more of:
        information about whether the UE performs the NAICS operation in the situation in which the CA has been configured; and
        information about a maximum number of carriers supportable for the NAICS, and
    wherein the information about the NAICS operation in the situation in which the CA has been configured comprises information about a carrier or frequency band on which the UE is capable of driving the NAICS.

2. The method of claim 1, further comprising including the information about the NAICS operation in the situation in which the CA has been configured in a physical uplink control channel (PUCCH) along with channel state information (CSI) and transmitting the PUCCH.

3. The method of claim 1, further comprising transmitting indication, indicating that the UE is incapable of driving the NAICS on one or more carriers selected by the eNB based on the transmitted UE capability information, to the eNB.

4. A user equipment (UE) performing network assisted interference cancellation and suppression (NAICS) in a situation in which a carrier aggregation (CA) has been configured, the UE comprising:
    a radio frequency (RF) unit; and
    a processor controlling the RF unit, wherein the processor performs processes of:
        receiving a UE capability request message;
        transmitting UE capability information in response to the UE capability request message;
        receiving interference cancellation assistance information from an eNB; and
        cancelling interference received from a neighbor cell based on the interference cancellation assistance information,
    wherein:
    the UE capability information comprises information about an NAICS operation in a situation in which the CA has been configured;
    the interference cancellation assistance information comprises information about a neighbor cell checked to operate in one or more carriers selected by the eNB based on the transmitted UE capability information;
    the information about the NAICS operation in the situation in which the CA has been configured comprises one or more of:
        information about whether the UE performs the NAICS operation in the situation in which the CA has been configured; and
        information about a maximum number of carriers supportable for the NAICS; and
    the information about the NAICS operation in the situation in which the CA has been configured comprises information about a carrier or frequency band on which the UE is capable of driving the NAICS.

5. The UE of claim 4, wherein the processor further performs a process of including the information about the NAICS operation in the situation in which the CA has been configured in a physical uplink control channel (PUCCH) along with channel state information (CSI) and transmitting the PUCCH.

6. The UE of claim 4, wherein the processor further performs a process of transmitting indication, indicating that the UE is incapable of driving the NAICS on one or more carriers selected by the eNB based on the transmitted UE capability information, to the eNB.

* * * * *